(12) United States Patent
Halsmer et al.

(10) Patent No.: US 7,540,659 B1
(45) Date of Patent: Jun. 2, 2009

(54) METHOD AND APPARATUS FOR ROTATING AN IMAGING SYSTEM DETECTOR

(75) Inventors: Matthew Aaron Halsmer, Waukesha, WI (US); Jonathan Carl Boomgaarden, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 35 days.

(21) Appl. No.: 11/944,325

(22) Filed: Nov. 21, 2007

(51) Int. Cl.
*G21K 4/00* (2006.01)
*A61B 6/00* (2006.01)

(52) U.S. Cl. .................................... 378/189; 378/98.8

(58) Field of Classification Search .............. 378/98.8, 378/189, 190, 195–198; 250/363.02, 363.04, 250/363.05, 363.08, 363.09; 464/50, 102–104, 464/160, 161
See application file for complete search history.

(56) References Cited

U.S. PATENT DOCUMENTS

| | | | | |
|---|---|---|---|---|
| 2,528,521 A * | 11/1950 | Kaiser | ................ | 378/62 |
| 4,139,776 A * | 2/1979 | Hellstrom | ................ | 378/25 |
| 4,412,346 A * | 10/1983 | Takenouti et al. | ........... | 378/181 |
| 4,651,007 A * | 3/1987 | Perusek et al. | ......... | 250/363.08 |
| 5,317,617 A * | 5/1994 | Lange | .................... | 378/65 |
| 5,636,259 A * | 6/1997 | Khutoryansky et al. | ..... | 378/197 |
| 6,067,342 A | 5/2000 | Gordon | | |
| 6,128,135 A * | 10/2000 | Stiles et al. | ................. | 359/597 |
| 6,412,978 B1 * | 7/2002 | Watanabe et al. | ........... | 378/197 |
| 6,614,871 B1 * | 9/2003 | Kobiki et al. | ................. | 378/20 |
| 6,851,851 B2 * | 2/2005 | Smith et al. | ................. | 378/189 |
| 7,143,728 B1 * | 12/2006 | Yasui | ..................... | 123/90.15 |
| 7,173,249 B2 * | 2/2007 | Komatsu et al. | ....... | 250/363.05 |
| 7,323,688 B2 | 1/2008 | Joung | | |
| 2007/0176106 A1 | 8/2007 | Hefetz | | |
| 2007/0194240 A1 | 8/2007 | Hefetz | | |

* cited by examiner

*Primary Examiner*—Edward J Glick
*Assistant Examiner*—Thomas R Artman
(74) *Attorney, Agent, or Firm*—The Small Patent Law Group; Dean D. Small

(57) ABSTRACT

A system is provided for rotating a detector of an imaging system about an axis of rotation. The system includes a shaft extending a length between a pair of opposite end portions. The shaft is threaded on an exterior surface thereof. A carriage is mounted on the shaft. The carriage is threadably connected to the shaft such that rotation of the shaft moves the carriage along the length of the shaft. A connection member has a first portion mounted on the carriage, and a second portion configured to be connected to the detector such that movement of the carriage along the shaft rotates the detector about the axis of rotation.

20 Claims, 5 Drawing Sheets

US 7,540,659 B1

METHOD AND APPARATUS FOR ROTATING AN IMAGING SYSTEM DETECTOR

BACKGROUND OF THE INVENTION

This subject matter described and illustrated herein relates generally to imaging systems, and more particularly to detectors for imaging systems.

Imaging systems typically include one or more detectors that detect something, for example radiation, to produce an image of an object. The detectors are typically mounted on a support structure that is movable to position the detectors in a variety of different locations. For example, some know detectors are mounted on a support arm that is vertically movable to position the detectors at a variety of different heights. Detectors may additionally or alternatively be rotatably mounted on the support structure such that the detectors can be tilted relative to the support structure to position the detectors in a variety of different orientations relative to the support structure.

It may be desirable to move the detector into different positions and/or orientations can be performed both manually by an operator and automatically, upon initiation by the operator or a controller, using a power source. At least some known imaging systems enable vertical movement of detectors both automatically and manually. However, some known imaging systems do not enable both automatic and manual tilting of detectors. Moreover, known imaging systems that enable both automatic and manual tilting of detectors typically tilt the detectors using a direct drive gear arrangement, which may limit the range of rotation of the detector relative to the support structure and/or may increase a size of the system that actuates titling of the detector.

BRIEF DESCRIPTION OF THE INVENTION

In one embodiment, a system is provided for rotating a detector of an imaging system about an axis of rotation. The system includes a shaft extending a length between a pair of opposite end portions. The shaft is threaded on an exterior surface thereof. A carriage is mounted on the shaft. The carriage is threadably connected to the shaft such that rotation of the shaft moves the carriage along the length of the shaft. A connection member has a first portion mounted on the carriage, and a second portion configured to be connected to the detector such that movement of the carriage along the shaft rotates the detector about the axis of rotation.

In another embodiment, an imaging system is provided. The imaging system includes a detector and a sub-system operatively connected to the detector for rotating the detector about an axis of rotation. The sub-system includes a shaft extending a length between a pair of opposite end portions. The shaft is threaded on an exterior surface thereof. A carriage is mounted on the shaft. The carriage is threadably connected to the shaft such that rotation of the shaft moves the carriage along the length of the shaft. A connection member interconnects the carriage and the detector such that movement of the carriage along the shaft rotates the detector about the axis of rotation.

In another embodiment, a method is provided for rotating a detector of an imaging system about an axis of rotation. The method includes providing a shaft that extends a length between a pair of opposite end portions and is threaded on an exterior surface thereof, mounting a carriage on the shaft in threaded connection with the shaft such that rotation of the shaft moves the carriage along the length of the shaft, and connecting the carriage to the detector such that movement of the carriage along the shaft rotates the detector about the axis of rotation.

DETAILED DESCRIPTION OF THE INVENTION

Figure 1:
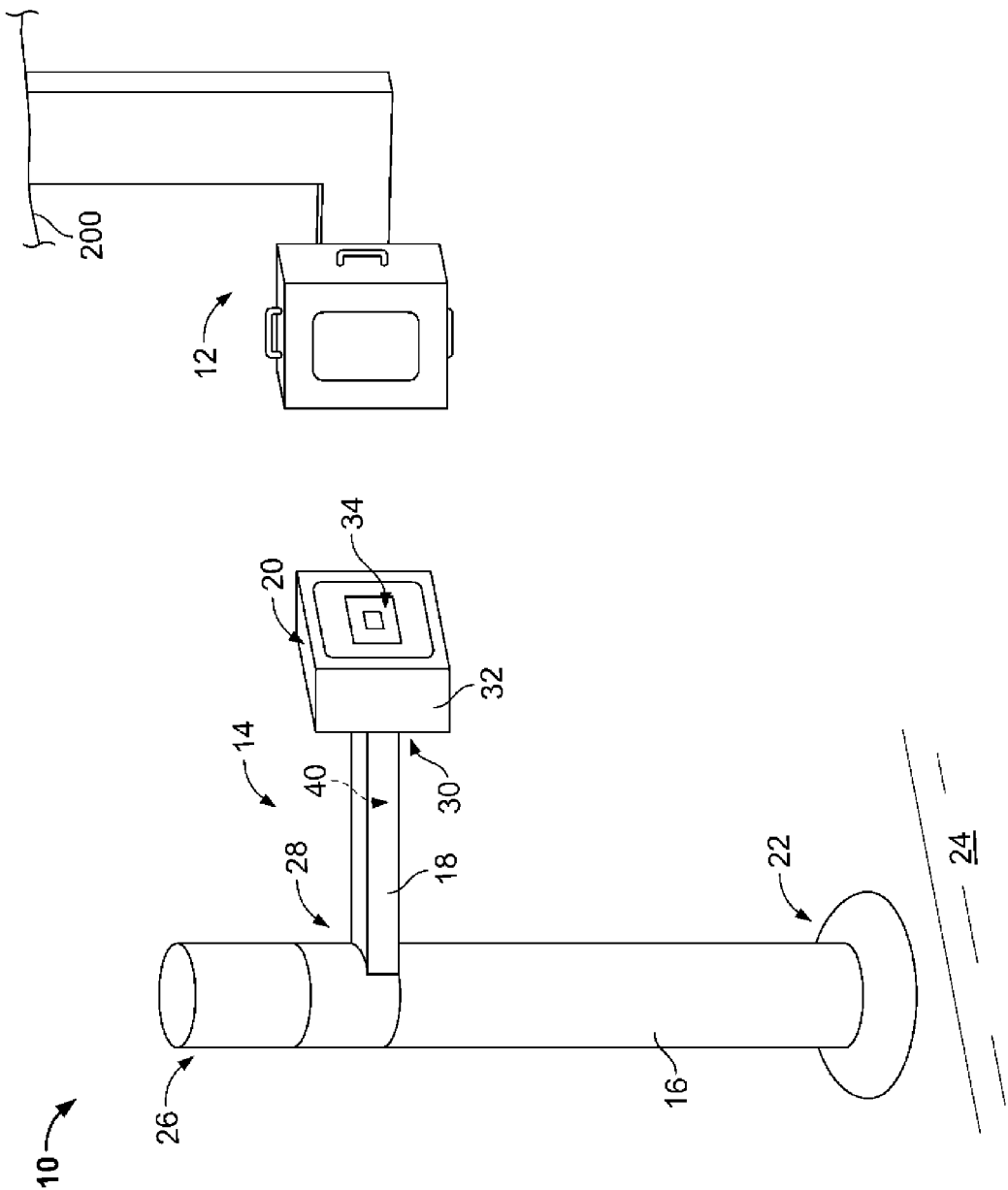
FIG. 1 is a perspective view of an exemplary embodiment of an imaging system.

The foregoing summary, as well as the following detailed description of certain embodiments of the subject matter described and illustrated herein, will be better understood when read in conjunction with the appended drawings. It should be understood that the various embodiments are not limited to the arrangements and instrumentality shown in the drawings.

Figure 2:
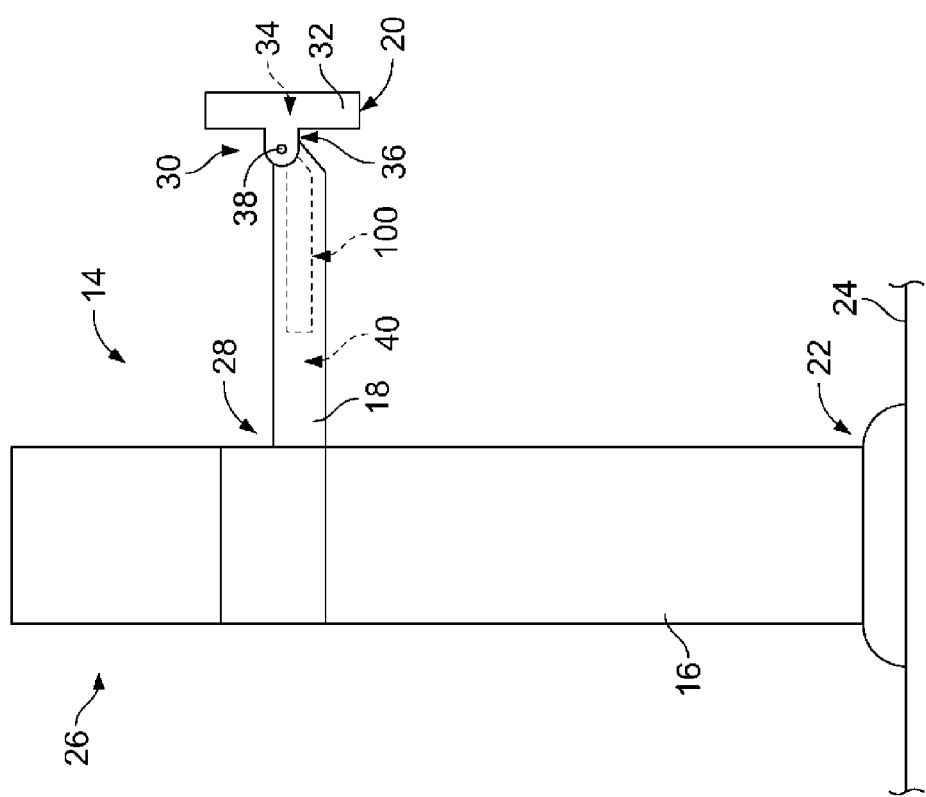
FIG. 2 is a side elevational view of an exemplary embodiment of a detector assembly of the imaging system shown in FIG. 1.

FIG. 1 is a perspective view of an exemplary embodiment of an imaging system 10. FIG. 2 is a side elevational view of an exemplary embodiment of a detector assembly 14 of the imaging system 10. In the exemplary embodiment, the imaging system 10 is an x-ray imaging system. The imaging system 10 includes an x-ray source 12 and the detector assembly 14. The detector assembly 14 includes a stand 16, a support arm 18 held by the stand 16, and a detector 20 held by the support arm 18. The stand 16 extends a height between an end portion 22 that rests on a floor 24 and an end portion 26 that is opposite the end portion 22. The support arm 18 extends outwardly from the stand along a length defined between an end portion 28 that is mounted on the stand 16 and an opposite end portion 30 that holds the detector 20. The support arm 18 is mounted on the stand 16 such that the support arm 18 is selectively movable along the height of the stand 16 to position the detector 20 for detection at a variety of different heights relative to the floor 24.

The detector 20 includes a housing 32 that holds a detection element 34. In the exemplary embodiment, the detection element 34 is any suitable x-ray detection element, such as, but not limited to, a photographic plate, a photostimulable phosphor (PSP), a geiger counter, a scintillator, a semiconductor, and/or the like. The detection element 34 is mounted on a support member 36 that is mounted to the end portion 30 of the support arm 18. The support member 36 is rotatably mounted on the support arm 18 such that the detector 20 can be rotated relative to the support arm 18 about an axis of rotation 38 to position the detector 20 for detection at a variety of different orientations, as will be described below. The detector assembly 20 includes a system 100 that is at least partially held within an interior space 40 of the support arm 18 for rotating the detector 20 about the axis of rotation 38.

Figure 3:
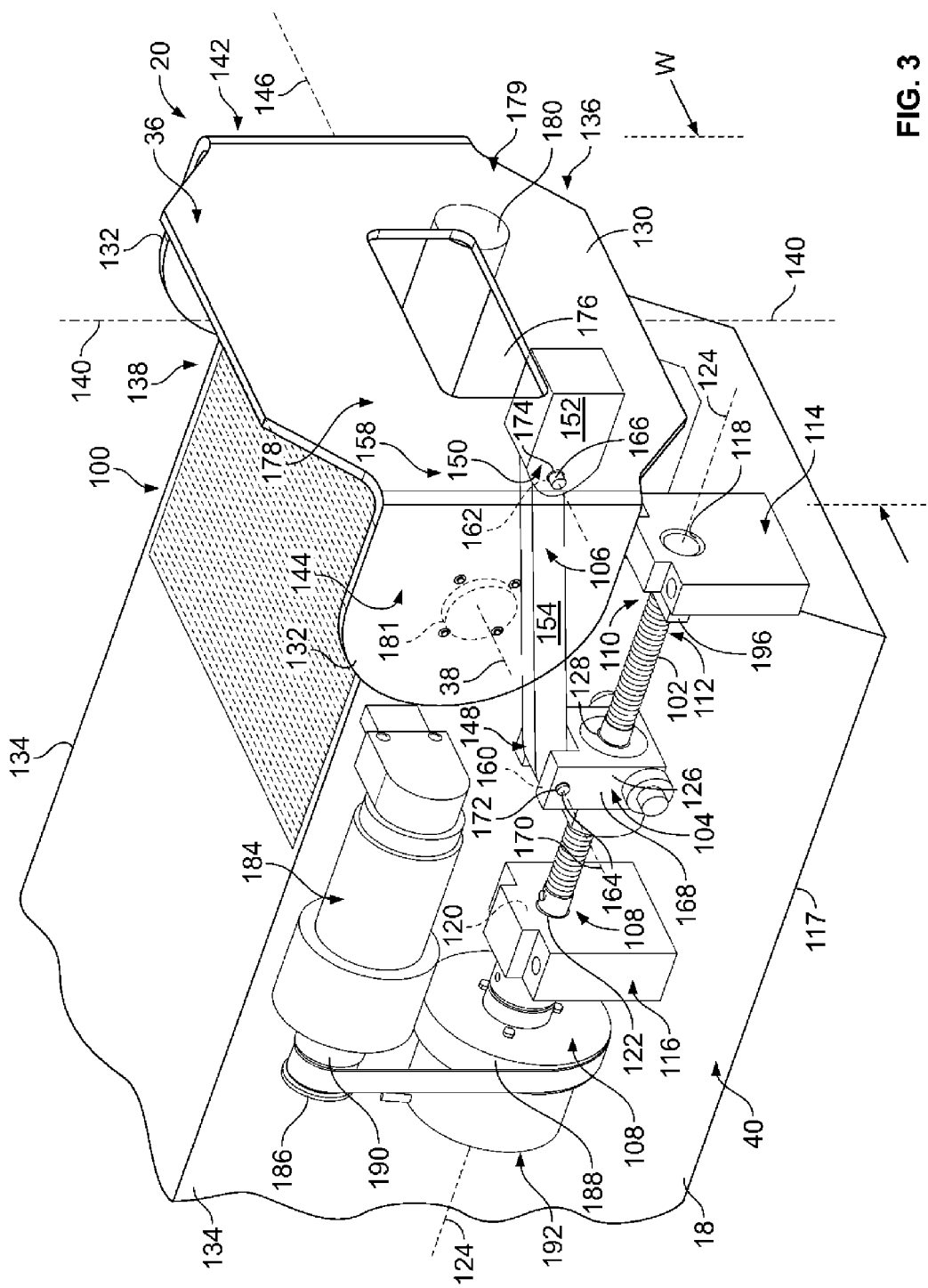
FIG. 3 is a perspective view of an exemplary embodiment of a system of the detector assembly shown in FIGS. 1 and 2.
Figure 4:
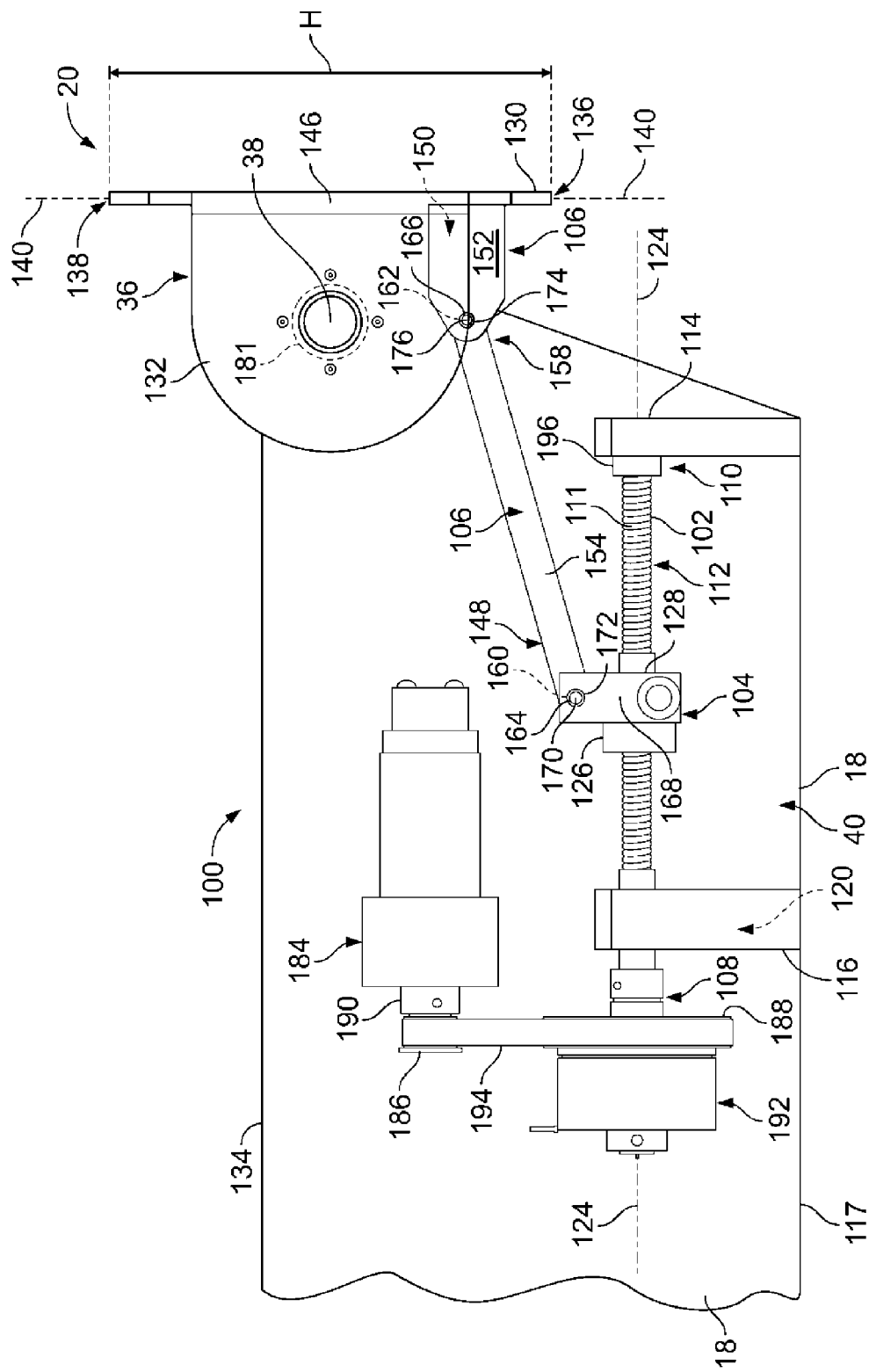
FIG. 4 is a side elevational view of the system shown in FIG. 3.

FIG. 3 is a perspective view of an exemplary embodiment of the system 100 of the detector assembly 14 (FIGS. 1 and 2). FIG. 4 is a side elevational view of the system 100. The system 100 includes a shaft 102, a carriage 104, and a connection member 106. In the exemplary embodiment, the shaft 102, the carriage 104, and a portion of the connection member 106 are contained within the interior space 40 of the support arm 18. The shaft 102 extends a length between a pair of opposite end portions 108 and 110. As indicated by the reference numeral 112, an exterior surface 111 of the shaft 102 is threaded along at least a portion the length of the shaft 102. In the exemplary embodiment, the shaft 102 is supported by two support members 114 and 116. Specifically, the end portion 110 of the shaft 102 is held within an opening 118 of the support member 114, and a portion 120 of the shaft 102 is held within an opening 122 of the support member 114. The shaft 102 is configured to rotate within the openings 118 and 122 about an axis of rotation 124 such that the shaft 102 rotates with respect to the support members 114 and 116. Any suitable type of bearing (not shown) may be provided between the shaft 102 and the portions of the support members 114 and 116 that define the respective openings 118 and 122 to facilitate rotation of the shaft 102 relative to the support members 114 and 116. Although two support members 114 and 116 are shown, the system 100 may include any number of support members that support the shaft 102. Moreover, the support members 114 and 116 may each be located anywhere along the length of the shaft 102 that enables the system 100 to function as described herein. The support members 114 and 116 may each be mounted to any portion of the support arm 18. In the exemplary embodiment, the support members 114 and 116 are mounted to a bottom wall 117 of the support arm 18.

The carriage 104 is mounted on the shaft 102 for movement along the length of the shaft 102. Specifically, the carriage 104 is threadably connected to shaft 102 such that rotation of the shaft 102 about the axis 124 moves the carriage 104 along the length of the shaft 102. The carriage 104 includes a body 126 having an opening 128 therein through which the shaft 102 is received. In the exemplary embodiment, the opening 128 has a closed geometrical shape such that the opening 128 surrounds the entire circumference of the portion of the shaft 102 that extends within the opening 128. However, the opening 128 may alternatively be an open geometrical shape such that the opening 128 surrounds only partially surrounds the circumference of the portion of the shaft 102 that extends within the opening 128.

In the exemplary embodiment, the carriage 104 includes one or more ball bearings (not shown) that communicate (extend at least partially within) with the opening 128 such that the ball bearing(s) engages the shaft 102, and more specifically the thread(s) 112 of the shaft 102, to threadably connect the carriage 104 to the shaft 102. As such, the carriage 104 and the shaft 102 define what is typically referred to as a "ball screw". In alternative to the ball bearing(s), a surface (not shown) of the carriage 104 that defines the opening 128 may be threaded (not shown, and such that the carriage 104 defines a nut), to threadably connect the carriage 104 to the shaft 102, such that the carriage 104 and the shaft 102 define what is typically referred to as a "leadscrew". In another alternative embodiment, the carriage 104 may include a combination of one or more ball bearing(s) and one or more threads to threadably connect the carriage 104 to the shaft 102.

As described above, the support member 36 of the detector 20 is rotatably mounted on the support arm 18 such that the detector 20 can be rotated relative to the support arm 18 about the axis of rotation 38. Specifically, the support member 36 includes a plate 130 on which the detector element 34 (FIG. 1) is mounted, and a pair of extensions 132 extending outwardly from the plate 130. The extensions 132 engage sidewalls 134 of the support arm 18 and are rotatably connected to the sidewalls 134 for rotation relative thereto about the axis 38. The plate 130 extends a height H between a pair of opposite end portions 136 and 138 and along a central axis 140. The plate 130 also extends a width W between a pair of opposite end portions 142 and 144 and along a central axis 146.

The connection member 106 interconnects the carriage 104 and the support member 36. Specifically, a portion 148 of the connection member 106 is carried by, or mounted on, the carriage 104 and a portion 150 of the connection member 106 is mounted on the support member 36. The connection member 106 may interconnect the carriage 104 using any suitable configuration, arrangement, structure, means, and/or the like that enables the system 100 to function as described herein. In the exemplary embodiment, the connection member 106 includes a clevis 152 and an arm 154. The arm 154 extends between the end portion 148 and an opposite end portion 158. The end portion 148 of the arm defines an end portion of the connection member 106. Each of the end portions 148 and 158 includes a respective opening 160 and 162 therein that receives a respective clevis pin 164 and 166 therethrough. Specifically, the arm opening 160 of the end portion 148 receives the clevis pin 164 of a clevis 168 that extends from the carriage 104. The clevis 168 connects the arm 154 to the carriage 104 and provides a pivot point, indicated by an axis of rotation 170, about which the arm 154 rotates when the carriage 104 moves along the length of the shaft 102. The clevis 168 includes a pair of openings 172 that hold end portions of the clevis pin 164. The clevis pin 164 may be held within the openings 160 and 172 using any suitable structure, means, and/or the like (not shown), such as, but not limited to, a clip, a cotter pin, and/or the like.

The clevis 152 defines an end portion of the connection member 106 that is opposite the end portion 148. The clevis 152 is mounted on the plate 130 of the support member 36 and includes a pair of openings 174 that hold end portions of the clevis pin 166. The opening 162 of the arm end portion 158 receives the clevis pin 166 such that the clevis 152 connects the arm 154 to the plate 130 of the support member 36. The clevis 152 provides a pivot point, indicated by an axis of rotation 176, about which the arm 154 rotates when the carriage 104 moves along the length of the shaft 102. The clevis pin 166 may be held within the openings 162 and 174 using any suitable structure, means, and/or the like (not shown), such as, but not limited to, a clip, a cotter pin, and/or the like.

The clevis 152, and thus the connection member 106, may be mounted on the plate 130 (or additionally or alternatively on one or both of the extensions 132) at any location of the plate 130 that enables the system 100 to function as described herein, for example any location that enables the detector 20 to rotate about the axis of rotation 38. In the exemplary embodiment, the clevis 152 is mounted on the plate to one side 178 of the central axis 140 and to one side 179 of the central axis 146 such that the connection point between the connection member 106 and the support member 36 is offset from a center of the width W of the plate 130 and from a center of the height H of the plate, which are defined by the central axes 140 and 146, respectively. One or more biasing mechanisms 180 may optionally be provided to engage the plate 130 on the side 179 of the central axis 146. The biasing mechanism(s) 180 engages the plate 130 to exert a bias on the side 179 of the plate 130 to balance the load, with respect to the axis of rotation 38, exerted on the plate 130 by the weight of various components of the detector 20, such as, but not limited to, the detection element 34 (FIGS. 1 and 2), the housing 32 (FIGS. 1 and 2), and/or the like. The biasing mechanism(s)

180 balances the load exerted on the plate 130 by the weight of the various components of the detector 20 by providing a torque about the axis of rotation 38 that counteracts the torque about the axis of rotation 38 created by the weight of the various components of the detector 20. The biasing mechanism(s) 180 may be mounted directly to the support arm 18 and/or to another structure to exert the bias on the side 182 of the plate 130. The biasing mechanism(s) 180 may be any suitable type of biasing mechanism that enables the biasing mechanism(s) 180 to function as described herein, such as, but not limited to, a gas spring, a helical spring, and/or the like. In addition or alternative to the biasing mechanism(s) 180, one or more biasing mechanisms 181 extending at least partially around the axis of rotation 38 may be included to provide a torque about the axis of rotation 38 that counteracts the torque about the axis of rotation 38 created by the weight of the various components of the detector 20. The biasing mechanism(s) 181 may be any suitable type of biasing mechanism that enables the biasing mechanism(s) 181 to function as described herein, such as, but not limited to, a helical spring and/or the like.

As described below, the detector 20 may be tilted (rotated about the axis 38) both manually by an operator and automatically, upon initiation by the operator or a control circuit (not shown) operatively connected to the system 100, using a power source. Automatic rotation of the shaft 102 about the axis 124, and thereby movement of the carriage 104 along the length of the shaft 102 and rotation of the detector 20 about the axis 38, may be driven by any suitable power source that enables the system 100 to function as described herein. In the exemplary embodiment, the power source is an electrical motor 184. The electrical motor 184 may be any suitable type of electrical motor, having any suitable power output, that enables the system 100 to function as described herein. The electrical motor 184 may be operatively connected to the shaft 102 for rotating the shaft 102 using any suitable configuration, arrangement, structure, means, and/or the like that enables the system 100 to function as described herein. In the exemplary embodiment, the electrical motor 184 is operatively connected to the shaft via a pair of pulleys 186 and 188. Specifically, the pulley 186 is connected to an output shaft 190 of the electrical motor 184 for rotation with the output shaft 190, and the pulley 188 is connected to the shaft 102 for rotation therewith (via a clutch 192 in the exemplary embodiment, as described below). The pulleys 186 and 188 may be connected together for rotation with each other using any suitable configuration, arrangement, structure, means, and/or the like, such as, but not limited to using a belt 194 and/or the like. Some or all of the pulleys 186 and 188 may alternatively be sprockets (not shown) that are connected together for rotation with each other using any suitable configuration, arrangement, structure, means, and/or the like, such as, but not limited to, using a chain (not shown) and/or the like. Moreover, some or all of the pulleys 186 and 188 may alternatively be gears (not shown) that are connected together for rotation with each other using any suitable configuration, arrangement, structure, means, and/or the like, such as, but not limited to, using teeth of the gears that interlock with one another.

The pulleys 186 and 188 may have any relative size for providing any relative rotational rate of the output shaft 190 and the shaft 102. For example, the relative rotation rate of the output shaft 190 and the shaft 102 may be identical, or the rotational rate of the output shaft 190 may be stepped up or down. Moreover, more pulleys, gears, sprockets, and/or the like may be included (such as, but not limited to, using a gearbox (not shown)) such that the relative rotational rates of the output shaft 190 and the shaft 102 may be variably selected (which may include identical rotational rates, stepping up the rotational rate of the output shaft 190, and/or stepping down the rotational rate of the output shaft 190). The electrical motor 184 may be mounted directly to the support arm 18, as shown in the exemplary embodiment, and/or to another structure. Although shown adjacent the end portion 108 of the shaft 102, the pulley 188 may be located anywhere along the length of the shaft 102 that enables the system 100 to function as described herein.

Optionally, the clutch 192 may be provided to selectively engage the pulley 188 for rotation with the shaft 102 and disengage the pulley 188 from rotation with the shaft 102. The clutch 192 thereby selectively connects and disconnects the electrical motor 184 to and from, respectively, operative connection with the shaft 102. The clutch 192 is operatively connected to the shaft 102 and the pulley 188. Specifically, the pulley 188 is mounted on the shaft 102 such that the pulley 188 is configured to rotate about the axis 124 with respect to the shaft 102. Any suitable type of bearing (not shown) may be provided between the shaft 102 and the pulley 188 to facilitate rotation of the pulley 188 relative to the shaft 102. The clutch 192 includes an engagement member (not shown) that is connected to shaft 102 for rotation with the shaft 102. The clutch engagement member is configured to engage the pulley 188 such that the pulley 188 rotates with the shaft 102 when the clutch engagement member is engaged with the pulley 188. When the clutch engagement member is disengaged from the pulley 188, the pulley 188 is free to rotate relative to the shaft 102. Although shown adjacent the end portion 108 of the shaft 102, the clutch 192 may be located anywhere along the length of the shaft 102 that enables the system 100 to function as described herein.

A brake 196 may optionally be included to prevent rotation of the shaft 102 about the axis 124 and thereby hold the detector 20 in a particular orientation, for example during detection by the detector 20. The brake 196 may be any suitable type of brake having any suitable configuration, arrangement, structure, means, and/or the like that enables the brake 196 to prevent rotation of the shaft 102 about the axis 124. Although shown adjacent the end portion 108 of the shaft 102, the brake 196 may be located anywhere along the length of the shaft 102 that enables the system 100 to function as described herein. Additionally or alternatively, the brake 196 may be operatively connected to the pulley 188.

In operation, the detector 20 may be tilted by manually rotating the detector 20 about the axis 38, such as, but not limited to, grasping the detector 20 (such as, but not limited to, the housing 32, a handle or other extension (not shown) extending from the housing 32, and/or the like) and rotating the detector 20 about the axis 38 and/or using a lever, crank, and/or the like (not shown) that is connected to the shaft 102 for rotation therewith about the axis 124. When disengaged from the pulley 188, the clutch 192 may facilitate manual rotation of the detector 20 by operatively disconnecting the electrical motor 184 from the shaft 102. When the operator manually rotates the detector 20 about the axis of rotation 38 by grasping the detector 20 as described above, rotation of the detector 20 applies a load through the connection member 106 to the carriage 104, which causes the shaft 102 to rotate about the axis of rotation 124 and thereby move the carriage 104 along the length of the shaft 102. Applying a load to the carriage 104 to rotate the shaft 102 and thereby move the carriage 104, as opposed to applying a load to the shaft 102 (e.g., using the electrical motor 184, the lever, the crank, and/or the like) to rotate the shaft 102 and thereby move the carriage 104, is typically referred to as "backdriving" of the system 100. Various parameters, such as, but not limited to, the lead angle (or pitch) of the thread(s) 112 of the shaft 102, the material(s) of the shaft 102 and/or the carriage 104, the coefficient of friction between the shaft 102 and the carriage 104, an amount of lubrication, and/or the like, may be selected to enable the system 100 to be backdriven when a predetermined amount of torque is applied to the detector 20. In some embodiments, the parameter(s) selected to enable the system 100 to be backdriven may be selected to enable the system 100 to be backdriven by a human operator by grasping the detector 20 (such as, but not limited to, the housing 32, a handle or other extension (not shown) extending from the housing 32, and/or the like) without the assistance of a power source (such as, but not limited to, the electrical motor 184, the lever, the crank, and/or the like).

When automatic rotation of the detector is desired, an operator may initiate rotation of the detector 20 using the control circuit or the control circuit may initiate the rotation based on a predetermined condition or occurrence. Once initiated, if not already engaged, the clutch 192 is engaged with the pulley 188 and the electrical motor 184 rotates the pulley 186, which rotates the pulley 188 and the shaft 102. Rotation of the shaft 102 causes the carriage 104 to move along the length of the shaft in a direction toward or away from the detector 20, depending upon the desired rotational direction of the detector 20. Movement of the carriage 104 along the shaft 102 causes the detector 20 rotate in the desired direction.

Various parameters, such as, but not limited to, an amount along the shaft length that the thread(s) extend, the relative size and/or shape of the various components of the system 100 and/or the detector assembly 14, the relative orientation and/or geometry of the various components of the system 100 and/or the detector assembly 14, any gear, sprocket, and/or pulley ratios, the location of the connection point of the connection member 106 to the support member 36, the power output of the electrical motor 184, the lead angle (or pitch) of the thread(s) 112 of the shaft 102, the material(s) of the shaft 102 and/or the carriage 104, the coefficient of friction between the shaft 102 and the carriage 104, an amount of lubrication, and/or the like may be selected to determine a range of rotation of the detector about the axis 38, a rate of rotation of the detector 20 about the axis 38, an amount of torque required to manually rotate the detector 20, and/or the like.

Figure 5:
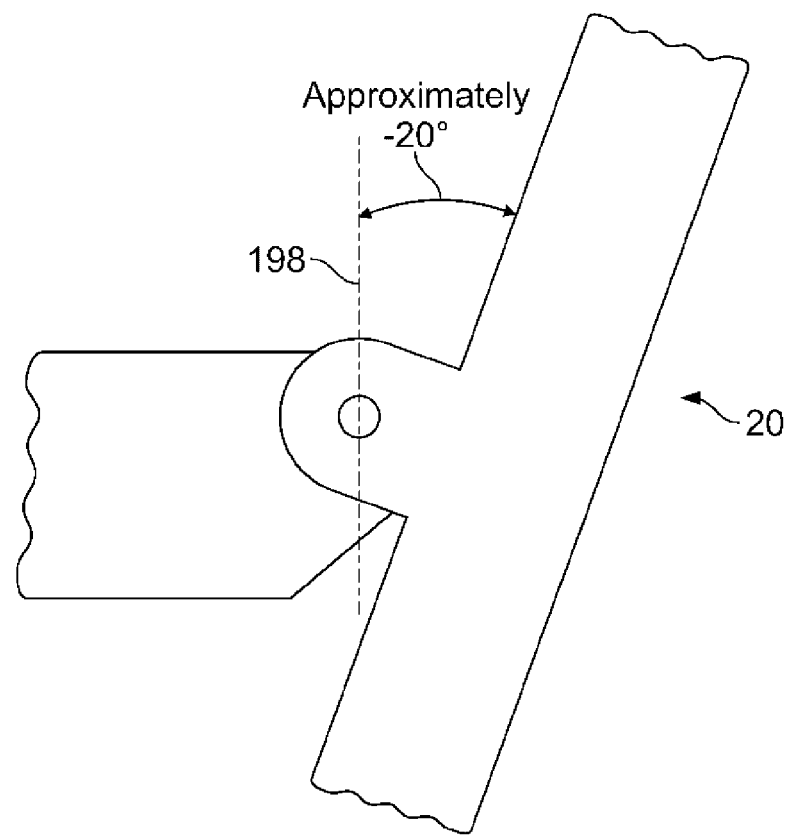
FIG. 5 is a side elevation view of a portion of the detector assembly shown in FIG. 2 illustrating one exemplary position of a detector of the detector assembly.
Figure 6:
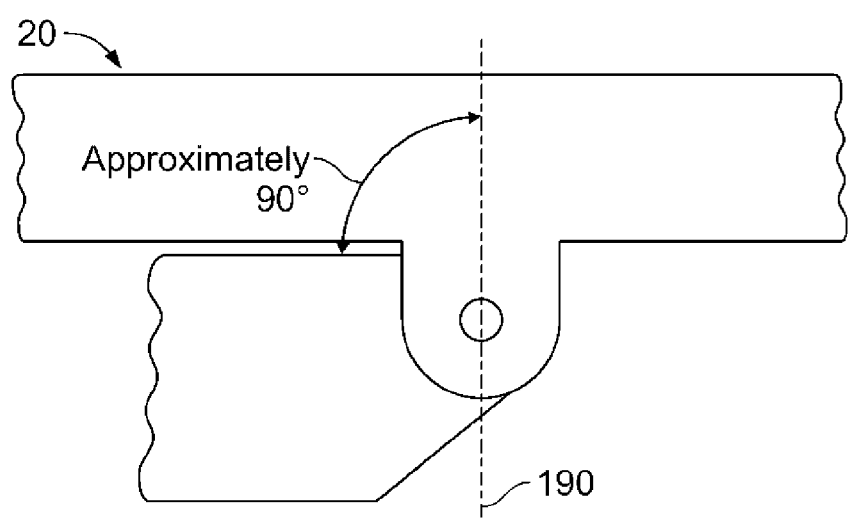
FIG. 6 is a side elevation view of a portion of the detector assembly shown in FIG. 2 illustrating another exemplary position of the detector.

The detector 20 may be provided with any suitable range and/or rate of rotation, such as, but not limited to, a range of motion of between approximately 10° and approximately 110°. For example, FIGS. 5 and 6 illustrate an exemplary range of rotation of the detector 20 of approximately 110°. Specifically, as shown in FIG. 5, the detector 20 is oriented at approximately −20° to an axis 198, while FIG. 5 shows the detector 20 oriented at approximately 90° to the axis 198. The range of rotation of the detector 20 is not limited to between approximately 100 and approximately 1100, but rather, in other embodiments may be any suitable range between 0° and approximately 360°.

Although in the exemplary embodiment the imaging system 10 is an x-ray imaging system, the system 100 is not limited for use with x-ray imaging systems. Rather, the system 100 may be used with any suitable type of imaging system having one or more detectors that may be rotatably positioned for detection in a variety of different orientations, such as, but not limited to, an ultrasound imaging system, an x-ray imaging system, a computed-tomography (CT) imaging system, a single photon emission computed tomography (SPECT) system, a positron emission tomography (PET) imaging system, a nuclear medicine imaging system, a magnetic resonance imaging (MRI) system, combinations thereof (e.g., a multi-modality imaging system), and/or the like. The imaging system 10 is not limited to medical imaging systems or imaging systems for imaging living subjects, but rather may include non-medical inspection apparatus for imaging non-living objects and/or for performing non-destructive imaging and/or testing, security imaging (such as, but not limited to, airport security screening), and/or the like. Moreover, the detector 20 is not limited to being mounted on a stand that extends generally upwardly from a floor, such as the stand 16 described and illustrated herein. Rather, the detector 20 may be mounted on any suitable support structure that holds the detector 20 in any suitable orientation(s) that enable the detector to detect, such as, but not limited to, a support structure that extends from a wall (not shown), a support structure that extends from a ceiling 200 (FIG. 1), and/or a patient support table (not shown). Moreover, the system 100 is not limited for use with the detector 20, but rather may be used to rotate an element of the imaging modality source, such as, but not limited to, the x-ray source 12 (FIG. 1).

The embodiments described and illustrated herein provide an imaging system detector that can be tilted relative to a support structure supporting the detector both manually by an operator and automatically using a power source. The embodiments described and illustrated herein may provide an imaging system detector that can be tilted relative to a support structure both manually and automatically with a less limited range of rotation as compared with at least some known imaging systems. The embodiments described and illustrated herein may provide an imaging system detector that can be tilted relative to a support structure both manually and automatically with a system that actuates titling of the detector that is smaller in size as compared with the tilting systems of at least some known imaging systems.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter described and illustrated herein without departing from its scope. Dimensions, types of materials, orientations of the various components, and the number and positions of the various components described herein are intended to define parameters of certain embodiments, and are by no means limiting and are merely exemplary embodiments. Although the various elements/components/etc. of the embodiments described herein may be in a particular order, arrangement, configuration, and/or the like, the elements/components/etc. may have other orders, arrangements, configurations, and/or the like without departing from the scope of the subject matter described and illustrated herein. Many other embodiments and modifications within the spirit and scope of the claims will be apparent to those of skill in the art upon reviewing the above description. The scope of the subject matter described and illustrated herein should, therefore, be determined with reference to the appended claims, along with the full scope of equivalents to which such claims are entitled. In the appended claims, the terms "including" and "in which" are used as the plain-English equivalents of the respective terms "comprising" and "wherein." When introducing elements/components/etc. described and/or illustrated herein, the articles "a", "an", "the", "said", and "at least one" are intended to mean that there are one or more of the element(s)/component(s)/etc. Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

While the subject matter described and illustrated herein has been described in terms of various specific embodiments, those skilled in the art will recognize that the subject matter described and illustrated herein can be practiced with modification within the spirit and scope of the claims.

What is claimed is:

1. A system for rotating a detector of an imaging system about an axis of rotation, the system comprising:
    a shaft extending a length between a pair of opposite end portions, the shaft being threaded on an exterior surface thereof;
    a carriage mounted on the shaft, the carriage being threadably connected to the shaft such that rotation of the shaft moves the carriage along the length of the shaft; and
    a connection member having a first portion mounted on the carriage, and a second portion connected to the detector such that movement of the carriage along the shaft rotates the detector about the axis of rotation.

2. The system according to claim 1, further comprising an electrical motor operatively connected to the shaft for rotating the shaft.

3. The system according to claim 1, further comprising an electrical motor operatively connected to the shaft for rotating the shaft, and a clutch operatively connected to the shaft and the electrical motor, the clutch being configured to connect the electrical motor to, and disconnect the electrical motor from, operative connection with the shaft.

4. The system according to claim 1, wherein the carriage and shaft are configured to be backdriven by a human operator without the assistance of a power source.

5. The system according to claim 1, wherein the detector comprises a support member, said system further comprising a biasing mechanism operatively connected to the support member for applying a torque to the support member.

6. The system according to claim 1, further comprising a brake operatively connected to the shaft, the brake configured to be engaged and disengaged with the shaft, the brake configured to prevent rotation of the shaft when engaged with the shaft.

7. The system according to claim 1, wherein the carriage comprises at least one ball bearing that engages the shaft such that the shaft and carriage define a ball screw.

8. The system according to claim 1, wherein the first and second portions of the connection member are opposite end portions of the connection member.

9. The system according to claim 1, wherein the detector comprises an x-ray detector.

10. An imaging system comprising:
    a detector; and
    a sub-system operatively connected to the detector for rotating the detector about an axis of rotation, the sub-system comprising:
        a shaft extending a length between a pair of opposite end portions, the shaft being threaded on an exterior surface thereof,
        a carriage mounted on the shaft, the carriage being threadably connected to the shaft such that rotation of the shaft moves the carriage along the length of the shaft; and
        a connection member interconnecting the carriage and the detector such that movement of the carriage along the shaft rotates the detector about the axis of rotation.

11. The imaging system according to claim 10, wherein the sub-system further comprises an electrical motor operatively connected to the shaft for rotating the shaft.

12. The imaging system according to claim 10, wherein the sub-system further comprises an electrical motor operatively connected to the shaft for rotating the shaft, and a clutch operatively connected to the shaft and the electrical motor, the clutch being configured to connect the electrical motor to, and disconnect the electrical motor from, operative connection with the shaft.

13. The imaging system according to claim 10, wherein the carriage and shaft are configured to be backdriven by a human operator without the assistance of a power source.

14. The imaging system according to claim 10, wherein the detector comprises a support member, and wherein the sub-system further comprises a biasing mechanism operatively connected to the support member for applying a torque to the support member.

15. The imaging system according to claim 10, wherein the sub-system further comprises a brake operatively connected to the shaft, the brake configured to be engaged and disengaged with the shaft, the brake configured to prevent rotation of the shaft when engaged with the shaft.

16. The imaging system according to claim 10, wherein the carriage comprises at least one ball bearing that engages the shaft such that the shaft and carriage define a ball screw.

17. The imaging system according to claim 10, wherein the detector comprises an x-ray detector.

18. A method for rotating a detector of an imaging system about an axis of rotation, said method comprising:
    providing a shaft that extends a length between a pair of opposite end portions and is threaded on an exterior surface thereof;
    mounting a carriage on the shaft in threaded connection with the shaft such that rotation of the shaft moves the carriage along the length of the shaft; and
    connecting the carriage to the detector such that movement of the carriage along the shaft rotates the detector about the axis of rotation.

19. The method according to claim 18, further comprising providing the carriage with at least one ball bearing that engages the shaft such that the shaft and carriage define a ball screw.

20. The method according to claim 18, further comprising
    providing an electrical motor operatively connected to the shaft for rotating the shaft;
    providing a clutch operatively connected to the shaft and the electrical motor; and
    configuring the clutch to connect the electrical motor to, and disconnect the electrical motor from, operative connection with the shaft.

* * * * *